E. CHILDS.
MACHINE FOR DRILLING STOCK.
APPLICATION FILED OCT. 6, 1905.
919,823.
Patented Apr. 27, 1909.
2 SHEETS—SHEET 1.
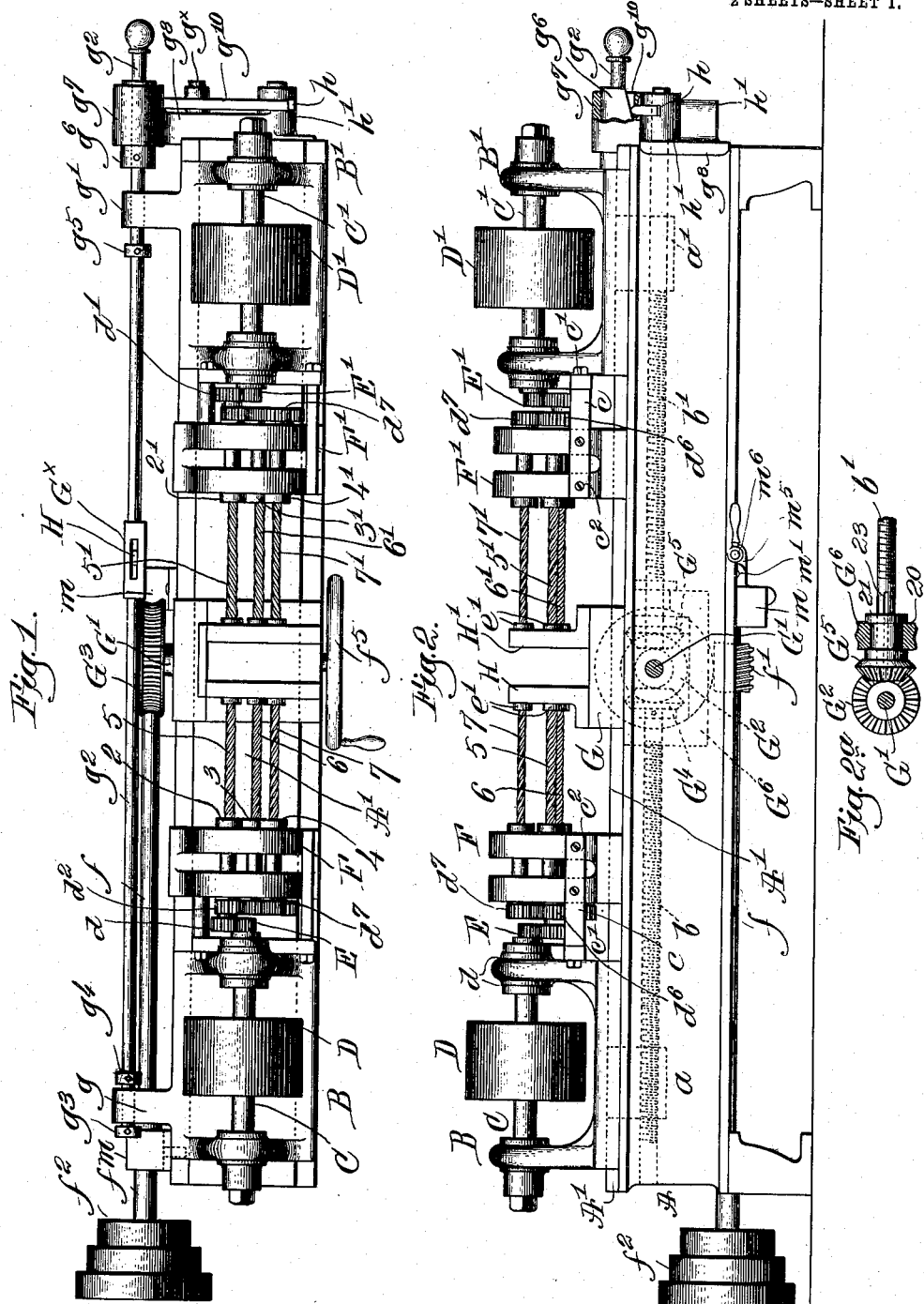
Witnesses.
Thomas J. Drummond.
S. Wm. Lutton.
Inventor.
Eugene Childs,
by Crosby Gregory Attys.

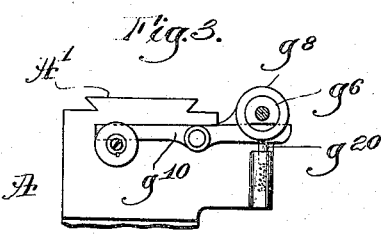
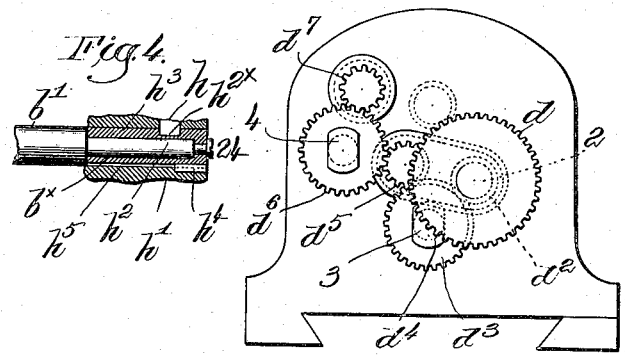
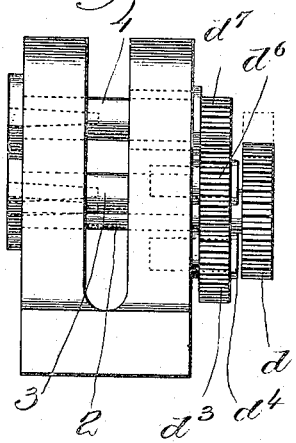
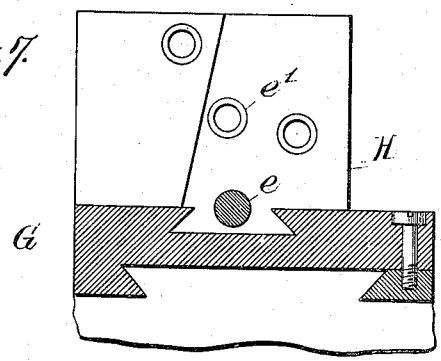
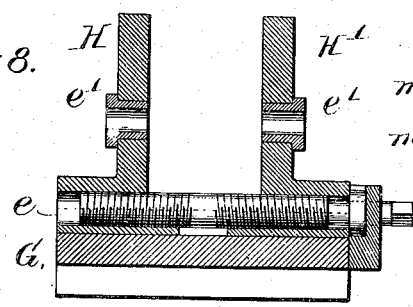
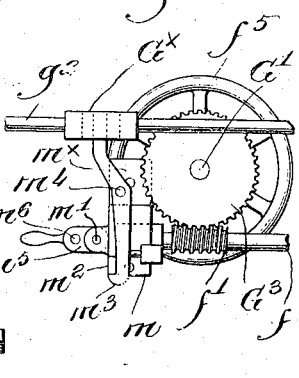

UNITED STATES PATENT OFFICE.

EUGENE CHILDS, OF BOSTON, MASSACHUSETTS, ASSIGNOR TO TRIMONT MANUFACTURING COMPANY, OF BOSTON, MASSACHUSETTS, A CORPORATION OF MAINE.

MACHINE FOR DRILLING STOCK.

No. 919,823.      Specification of Letters Patent.      Patented April 27, 1909.

Application filed October 6, 1905. Serial No. 281,590.

*To all whom it may concern:*

Be it known that I, EUGENE CHILDS, a citizen of the United States, residing at Brookline, in the county of Suffolk and State of Massachusetts, have invented an Improvement in Machines for Drilling Stock, of which the following description, in connection with the accompanying drawing, is a specification, like characters on the drawings representing like parts.

This invention has for its object the production of a novel drilling machine to drill a plurality of holes simultaneously in metal objects hereinafter designated by the name of "stock", the stock to be drilled being chucked or held in a suitable manner in a jig, the shape of which may vary with the article to be drilled.

The drills or tools are mounted in drill-heads connected with carriages that have coöperating with them mechanism for moving the carriages and drill-heads in a direction to cause the drills to enter the stock and drill holes therein. Each carriage has a plurality of drills, two drills in axial alinement, one drill in each carriage constituting what is designated as a pair of drills.

The drills of each pair of drills act simultaneously to drill holes into the stock from opposite directions, and the extent of longitudinal movement of each drill will depend upon the depth of the holes to be drilled in the stock. The holes may be drilled for any desired depth and the drilling may be stopped short of the holes meeting, or the holes may be connected by imparting longer movement to one drill-head after arresting the other drill-head, which may be moved backwardly to retract its drills from the holes made therein, which holes are to be entered by the drills of the drill-head that is continued in operation.

Figure 1 in plan view represents a drilling machine embodying my invention in one particular form; Fig. 2 is a side elevation thereof; Fig. 2ª is a sectional detail longitudinally of the gear $G^4$; Fig. 3 is a detail looking at the right hand end of Fig. 2; Fig. 4 is a sectional detail through the end of the rod $d'$; Fig. 5 is a side elevation of one of the drill heads removed; Fig. 6 is a view of the drill-head, Fig. 5, looking at the same from the right; Fig. 7 is a vertical transverse section through the jig; Fig. 8 is a vertical section through the jig taken longitudinally of the machine, said figure showing the means for clamping the stock in the jig; and Fig. 9 is a detail hereinafter referred to.

The bed A of the drill has at its upper side usual dove-tailed track A', the shape of which is shown in section, Fig. 3, on which is mounted to slide two carriages B, B', having usual bearings to support spindles C, C', provided with driving means D, D', shown as pulleys that may receive belts driven from any suitable countershaft at any desired speed. The spindles C, C', have at their ends respectively driving gears E, E'. The underside of each carriage B, B', has a threaded nut $a$, $a'$, said nuts being engaged respectively by threads of shafts $b$, $b'$, rotated, as will be described, to move said carriages over the bed A and with them their connected drill heads F, F'.

The carriages B, B', are connected respectively with the drill-heads F, F', by bars $c$ connected with each carriage by screw $c'$, said bar being secured to each drill-head by other screws $c^2$. The drill-heads each have a series of rotatable drill-carrying spindles 2, 3, 4, and 2', 3', 4', that receive and hold firmly respectively drills 5, 6, 7, and 5', 6', 7'. The drills 5, 5', constitute a pair, and likewise the drills 6, 6', and 7, 7'. These spindles and their drills are rotated positively from the driving gears E, E', on the driving shafts C, C', said gears engaging positively the larger toothed gears $d$ and $d'$ connected with the chucks 2 and 2'. The gears $d$ and $d'$ both alike each have connected with them a pinion $d^2$ that engages the tooth of an intermediate pinion $d^3$ rotatable about a suitable stud $d^4$ sustained in the drill-head. Each pinion $d^3$ engages a pinion $d^5$ connected with the intermediate chucks 3, 3'. Each pinion $d^5$ engages a like intermediate gear $d^6$ revoluble about a stud and said gears $d^6$ each engage a pinion $d^7$, there being one such pinion at the outer end of each of the chucks 2 and 2' carrying the drills 5, 5'. The drill-carrying spindles 4 and 4' which carry the drills 7 and 7' derive their movements from the pinions $d^2$ which with the gears $d$ are fixed on said chuck.

With the gearing shown in Fig. 5, the drills may be supposed to be rotated at the same speed, but by changing the pinions $d^2$, $d^5$, $d^7$, for those of other sizes, the drills may be driven at any desired speed, either slower or faster, as the work may require. The chucks may be of any usual or suitable shape commonly employed to grasp drills or tools and hold them firmly.

The track or way of the drill-bed has secured to the same between the drill-heads a block G, the latter embracing the usual track and being fixed with relation thereto. This block is employed to hold the jig, of whatever form, that depending upon the shape of the stock to be drilled. The jig shown comprises two uprights H, H', each having a dovetailed foot, see Fig. 7, to enter a dovetailed groove in the upper side of the block G. These feet receive a right and left adjusting screw $e$ that may be rotated to move said uprights toward or from each other that they may clamp in usual manner and center the stock to be drilled.

The uprights H and H' receive each a plurality of bushings $e'$ in which may slide the ends of the drill as the latter enter the stock, said bushings acting as guides for the drills to hold them steadily up to their work as the drills are rotated and while they enter the stock. The drill-bed is bored at one side or provided with a hole to constitute a bearing for a short shaft G', see Fig. 1, that at its inner end is provided with a miter-gear $G^2$, said shaft at its outer end being provided with a worm-toothed gear $G^3$ that is rotated by a worm $f'$ on a shaft $f$ sustained in suitable bearings on the bed and having, as shown, a stepped pulley $f^2$ to provide for driving said shaft at any desired speed. The miter-gear $G^2$ engages other miter gears $G^4$, $G^5$, at the inner ends of screw-shafts $b$, $b'$, said shafts being sustained near their inner ends in a suitable bearing $G^6$ represented by dotted lines and other bearings at the ends of the frame. The threaded portions of the shafts $b$, $b'$ enter the threaded projections $a$, $a'$ depending respectively from the under sides of the carriages B, B', and move said carriages and their connected drill-heads, as the drills enter the stock, as will be described.

The carriages B, B' have respectively projecting ears $g$, $g'$ that receive loosely a controlling-rod $g^2$ having an opening $G^x$ for the reception of a hand-lever H by which to effect the disengagement of the worm $f'$ from the worm-wheel when the carriage B is to be slid into starting position. The rod $g^2$ each side the ear $g$ has secured thereto collars $g^3$, $g^4$, said rod having a third collar $g^5$ connected therewith at a distance from the ear $g'$. The rod $g^2$ also has an attached sleeve $g^6$ beveled at its under side, see Fig. 2, and extended through the hub $g^7$ of a bearing $g^8$ mounted on the end of the bed and slotted at its under side, see Fig. 3. The bearing $g^8$ has a projecting stud $g^x$ on which is mounted a releasing device $g^{10}$ one end of which enters a notch $h$ in the hub $h'$ at one end of the bearing $g^8$, one end of said releasing device through the spring pressed pin $g^{20}$ being held normally against the beveled under side of the sleeve $g^6$. The reduced ends $b^x$ of the screw-rod $b'$ is surrounded by a sleeve $h^3$ notched at $h^{2x}$, see Fig. 4, and united slidably with the hub $h'$ having a spline $h^4$ that fits a groove in said sleeve. The hub $h'$ has a groove $h$ that is entered by the end of the lever $g^{10}$ and said lever also enters the notch $h^{2x}$ and prevents any sliding of the screw-rod so long as both drills are entering and boring the stock. The end of the screw-rod and the sleeve $h^3$ are united loosely by a screw 24. The underside of the sleeve $g^6$ is beveled next the releasing device, see Fig. 2, and when said controlling rod occupies the position, Fig. 2, the releasing device occupies a position in the notch $h$.

The bevel gear $G^5$, shown separately in Fig. 2$^a$, has a long hub 20 that turns in a hole in the bearing $G^6$ and is prevented from longitudinal movement therein by a collar 21, and the hub 20 has a spline 22 that enters a groove 23 in the screw $b'$. The bearing $m$ sustaining the worm-shaft $f$ is pivoted as at $m'$, see dotted lines Figs. 1 and 2, so that it may be turned slightly when it is desired to lower the end of said shaft having the worm $f'$ to disconnect the worm from the worm gear $G^3$ fast on the end of the shaft G' carrying the bevel pinion $G^2$ and the hand-wheel $f^5$.

The bearing $m$ has a projection $m^2$ that when all the drills are entering the stock, is engaged by a latch $m^3$, pivoted at $m^4$, in the stand $m^x$, the upper end of the latch entering the hole $g^x$ in the controlling rod.

In operation let it be assumed that Fig. 1 shows the parts in substantially the position occupied when the machine is ready to be started, and it will be noticed that the collar $g^4$ is located at a distance from the ear $g$ and that the collar $g^5$ is located at a farther distance from the ear $g'$. The rotation of the shaft $f$ rotates the shaft G' and causes its bevel-gear $G^2$ through the bevel-gears $G^4$, $G^5$ to rotate the screws $b$, $b'$, and these screws cause the two carriages B and B' and their connected drill-heads provided with the described drills or tools, to be moved toward each other that the points of the drills may enter the stock held in the jig. At the proper time after the carriage is started, the ear $g$ meets the collar $g^4$ and starts the rod $g^2$, but before the drills have entered the stock from its opposite side far enough for the ends of the drills to meet, the rod $g^2$ is moved far enough to cause the beveled under side of the sleeve $g^6$ to meet one end of the releasing-lever $g^{10}$ and turn the same so that said releasing-lever retires from the notch $h^{2x}$ in the sleeve $h^3$. Just after the releasing-lever is moved as described, to release the sleeve, the collar $g^5$ contacts with the ear $g'$ of the carriage B' and starts said carriage backwardly or to the right, viewing Fig. 1, withdrawing the drills from the holes in the stock, and during the retiring movement of the carriage B' and the connected drill-head F', the carriage B and drill-head F continue to move in the same direction until the holes drilled by the pairs of drills are opened into one, or the stock between the holes drilled by the two drills of the pair is removed. The turning of the releasing-lever as described permits the sleeve $h^3$ to slide in the bearing $h'$, and the screw-rod $b'$, the rotation of which is continued, to slide in the hub of the bevel-gear $G^5$ as the nut $a'$ of the carriage B' is being pushed backwardly by the collar $g^5$. As the carriage B' completes its backward stroke through the controller-rod, one end of the slot $g^x$ thereon meets the upper end of the latch and turns the same to release the bearing-block $m^2$ and disconnects the worm from the worm-gear. Preparatory to starting the machine for another operation the hand-wheel will be turned in a direction to cause the screw-rod $b$ to bring the carriage and drill-head B and F into starting position, such operation of the hand-wheel and shaft G' turning the screw-rod $b'$ in the nut $a'$ and thereby giving a longitudinal movement to the sleeve $h^3$. As soon as the sleeve $h^3$ reaches the position shown in Fig. 4 the releasing lever $g^{10}$ is forced into the notch $h^{2\times}$ by the spring $g^{20}$ thereby locking the screw-rod $b'$ against longitudinal movement. When this occurs the carriage B' will be moved back to its initial position along with the carriage B.

The carriages, the two screw-rods, their actuating means, and the rod $g^2$ are common to other drills wherein each carriage actuates but a single drill, but by the addition to a drill of the class referred to of the drill head containing a plurality of drills and gearing for rotating the same, it is possible to bore a plurality of holes in stock at each inward movement of the carriage.

Having described my invention, what I claim and desire to secure by Letters Patent is:—

1. In a machine of the class described, a pair of tool-carrying devices, a head to sustain each tool-carrying device, means to rotate said devices, actuating means to move said heads forwardly toward each other, means both to render inoperative the connection between one head and the actuating means before the other head completes its forward movement and to connect said heads together whereby the first named head is given a reverse movement during the final movement of the latter head.

2. In a machine of the class described, means to hold stock to be drilled, two drill heads, a carriage for each drill head, means to move said carriages and their connected drill heads forwardly, means actuated by the movement of one of said carriages to arrest the movement of the other carriage before the first named carriage has completed its stroke and to reverse the direction of the former carriage during the final movement of said other carriage.

3. In a machine of the class described, a pair of drill heads each having a drill-holding device, a carriage associated with each drill head, gearing on each carriage for rotating the tool-holding device of the associated drill head, a lead screw for each carriage, means actuated by one carriage before it completes its forward movement to render the lead screw for the other carriage inoperative and to reverse the direction of movement of said other carriage during the final movement of said first named carriage.

4. In a device of the class described, a pair of heads, a drill-holding device sustained by each head, a lead screw for moving said heads toward each other, a thrust rod connected with and actuated by one head, and means operated by said thrust rod to render inoperative the connections between the other head and its lead screw before the first named head completes its forward movement.

5. In a device of the class described, a pair of heads, a drill-holding device sustained by each head, a lead screw for moving said heads toward each other, a thrust rod connected with and actuated by one head, means operated by said thrust rod to render inoperative the connections between the other head and its lead screw before the first named head completes its forward movement, and means associated with the thrust rod to positively move the latter head backwardly during the final forward movement of the first named head.

6. In a machine of the class described, two heads each having a drill-holding device, a lead screw for each head, means to rotate the lead screw to move the heads toward each other, a releasing device associated with one lead screw to operatively connect or disconnect said lead screw to its corresponding head, and means actuated by the other head to actuate said releasing device before said other head completes its forward movement.

In testimony whereof, I have signed my name to this specification, in the presence of two subscribing witnesses.

EUGENE CHILDS.

Witnesses:
 GEO. W. GREGORY,
 LOUIS C. SMITH.